United States Patent
Navío Gilaberte et al.

(10) Patent No.: US 9,182,149 B2
(45) Date of Patent: Nov. 10, 2015

(54) MOLTEN SALT SOLAR RECEIVER AND PROCEDURE TO REDUCE THE TEMPERATURE GRADIENT IN SAID RECEIVER

(75) Inventors: Raúl Navío Gilaberte, Seville (ES); Paula Llorente Folch, Seville (ES); María del Carmen Romero Delgado, Seville (ES)

(73) Assignee: Abengoa Solar New Technologies, S.A., Seville (ES)

( * ) Notice: Subject to any disclaimer, the term of this patent is extended or adjusted under 35 U.S.C. 154(b) by 572 days.

(21) Appl. No.: 13/522,235

(22) PCT Filed: Jan. 14, 2011

(86) PCT No.: PCT/ES2011/000005
§ 371 (c)(1), (2), (4) Date: Jul. 13, 2012

(87) PCT Pub. No.: WO2011/086215
PCT Pub. Date: Jul. 21, 2011

(65) Prior Publication Data
US 2013/0199517 A1    Aug. 8, 2013

(30) Foreign Application Priority Data

Jan. 15, 2010  (ES) .................................. 201000047

(51) Int. Cl.
*F24J 2/07* (2006.01)
*F24J 2/46* (2006.01)
(Continued)

(52) U.S. Cl.
CPC *F24J 2/4649* (2013.01); *F24J 2/07* (2013.01); *F24J 2/34* (2013.01); *F24J 2/46* (2013.01);
(Continued)

(58) Field of Classification Search
CPC ........... F24J 2/07; F24J 2/34; F24J 2002/003; H02S 99/00; Y02E 10/41; Y02E 60/145; Y02E 70/30; F03G 2006/008; F03G 6/02; F28D 2020/006; F28D 2020/0047
USPC ......... 126/646, 617, 640, 684, 619, 648, 649, 126/651, 663, 678, 679, 904, 906; 60/641.11, 641.15, 641.8; 250/203.4
IPC .................... F24J 2/07; F03G 6/02; H02S 99/00
See application file for complete search history.

(56) References Cited

U.S. PATENT DOCUMENTS 1,993,213 A * 3/1935 Gill ................................ 126/615
3,931,806 A * 1/1976 Hayes ............................ 126/587
(Continued)

FOREIGN PATENT DOCUMENTS

EP    1930587 A2    6/2008
FR    2482205 A *  11/1981    ................ F03G 7/02

OTHER PUBLICATIONS

"FR_2482205_A_M—Machine Trans.pdf"; Machine translation of FR-2482205-A; http://www.epo.org; Nov. 22, 2014.*
(Continued)

*Primary Examiner* — Gregory Huson
*Assistant Examiner* — Daniel E Namay
(74) *Attorney, Agent, or Firm* — Kilpatrick Townsend & Stockton LLP

(57) ABSTRACT

Molten salt solar receiver and procedure to reduce the temperature gradient in said receiver. The receiver consists of at least one panel of semi cylindrical geometry, formed by a combination of vertical pipes. The receiver (10) is supplied with a heat transfer fluid made up of molten salts which originate from a recirculation system which is composed of a mixture deposit (6), a hot salt storage tank (9) and a cold salt storage tank (8); the mixture tank (6) which is supplied by a part of the hot heat transfer fluid (4) which exits the receiver (10) and the cold heat transfer fluid (5) which exits the cold salt storage tank (8); the hot salt storage tank is connected to the exit of the receiver (10) so that a part of the heat transfer fluid which does not recirculate is stored (3).

9 Claims, 2 Drawing Sheets

(51) Int. Cl.
*F24J 2/34* (2006.01)
*F28D 20/02* (2006.01)
*F03G 6/02* (2006.01)
*H02S 99/00* (2014.01)
*F28D 20/00* (2006.01)

(52) U.S. Cl.
CPC ........ *F28D 20/028* (2013.01); *F28D 2020/006* (2013.01); *F28D 2020/0047* (2013.01); *Y02E 10/41* (2013.01); *Y02E 10/46* (2013.01); *Y02E 60/145* (2013.01); *Y02E 70/30* (2013.01)

(56) References Cited

U.S. PATENT DOCUMENTS

| | | | | |
|---|---|---|---|---|
| 4,012,920 A * | 3/1977 | Kirschbaum | ............... | 62/235.1 |
| 4,237,859 A * | 12/1980 | Goettl | ............... | 126/400 |
| 4,299,277 A * | 11/1981 | McGregor | ............... | 165/48.2 |
| 4,376,435 A * | 3/1983 | Pittman | ............... | 126/563 |
| 4,385,625 A * | 5/1983 | Lee | ............... | 126/590 |
| 4,458,669 A * | 7/1984 | Lee | ............... | 126/618 |
| 4,738,305 A * | 4/1988 | Bacchus | ............... | 165/48.2 |
| 5,048,507 A * | 9/1991 | Ridett | ............... | 126/620 |
| 5,386,709 A * | 2/1995 | Aaron | ............... | 62/199 |
| 5,444,972 A * | 8/1995 | Moore | ............... | 60/39.182 |
| 5,862,800 A | 1/1999 | Marko | | |
| 6,701,711 B1 | 3/2004 | Litwin | | |
| 6,957,536 B2 * | 10/2005 | Litwin et al. | ............... | 60/641.8 |
| 7,296,410 B2 * | 11/2007 | Litwin | ............... | 60/641.12 |
| 7,685,820 B2 * | 3/2010 | Litwin et al. | ............... | 60/641.11 |
| 7,836,721 B2 * | 11/2010 | Nishiwaki et al. | ............... | 62/434 |
| 8,365,529 B2 * | 2/2013 | Litwin et al. | ............... | 60/641.11 |
| 2004/0099261 A1 | 5/2004 | Litwin | | |
| 2005/0126170 A1 | 6/2005 | Litwin | | |
| 2007/0214829 A1 * | 9/2007 | Otake et al. | ............... | 62/515 |
| 2007/0251258 A1 * | 11/2007 | Nishiwaki et al. | ............... | 62/333 |
| 2010/0163016 A1 * | 7/2010 | Pan | ............... | 126/613 |
| 2011/0139146 A1 * | 6/2011 | Ohkawa | ............... | 126/609 |
| 2012/0102950 A1 * | 5/2012 | Turchi | ............... | 60/641.15 |
| 2013/0118481 A1 * | 5/2013 | Wasyluk et al. | ............... | 126/663 |
| 2013/0199517 A1 * | 8/2013 | Navio Gilaberte et al. | ... | 126/646 |
| 2014/0223906 A1 * | 8/2014 | Gee et al. | ............... | 60/641.15 |

OTHER PUBLICATIONS

IPRP/WO for related PCT/ES2011/000005 issued on Jul. 17, 2012, and its English translation.
ISR for related PCT/ES2011/000005 mailed on Jun. 6, 2011, and its English translation.

* cited by examiner

MOLTEN SALT SOLAR RECEIVER AND PROCEDURE TO REDUCE THE TEMPERATURE GRADIENT IN SAID RECEIVER

CROSS-REFERENCE TO RELATED APPLICATIONS

This application is the U.S. National Stage of International Patent Application No. PCT/ES2011/000005 filed on Jan. 14, 2011, which claims priority to Spanish Patent Application No. P201000047 filed on Jan. 15, 2010, the disclosures of which are hereby incorporated by reference in their entireties.

TECHNICAL FIELD OF THE INVENTION

This invention belongs to the technical field of high concentration solar thermoelectricity. It is based on solar central tower technology with heliostat fields for the generation of electrical energy. A mixture of molten salts are used in the receiver as a heat transfer fluid which allows high working temperatures to be reached and, consequently, increases the efficiency of the thermodynamic cycle with respect to the use of water/steam as a heat transfer fluid.

BACKGROUND OF THE INVENTION

Found within the technical field of high concentration solar thermoelectricity are solar central tower systems in which direct solar radiation is reflected by a field of heliostats towards the receiver, situated on the upper part of the tower (optical system focus). The receiver is the system where all the solar radiation coming from the solar field concentrates. This solar energy transforms into the thermal energy of the heat transfer fluid. In the event that water is not used as a heat transfer fluid, a heat exchanger is required where the thermal energy from the heat transfer fluid is transferred to the water for the production of steam, overheated at a high temperature. Finally, this overheated steam is carried to the turbine and then to an alternator to generate electricity.

Currently, there are different types of receivers to which variations can be made to the heat transfer fluid as well as the way the energy is transferred to it or the configuration of the receiver itself. Of this type, there are pipe receivers, volumetric receivers, receivers of direct or indirect energy exchange, saturated steam and overheated steam receivers, etc.

The receivers on concentrated solar power towers can be exterior or dispose of a cavity located on the upper part of said tower with the aim of reducing thermal losses. The configuration must allow the incident power to exceed the losses caused by radiation and convection. In molten salt receivers, the temperature reached on the surface of the receiver is greater than in saturated and overheated water/steam receivers, which is why radiation losses are also greater; however, this is solved by generating overheated steam at higher temperatures through the use of the exchanger, which leads to greater efficiency in the thermodynamic cycle.

Therefore, the main advantage of molten salt receiver plants stems from the fact that, to work with heat transfer fluid at high-energy levels, after the use of the heat exchanger for the production of overheated steam, temperatures are reached that are greater (550° C.) than those obtained in plants with receivers that directly produce overheated steam (520° C.); thus the efficiency of the thermodynamic cycle is increased and consequently increases the performance of the turbine. If instead of using water/steam, we use a mixture of molten salts as a heat transfer fluid, it is estimated that the efficiency of the cycle can increase from 28% to 38%.

The salt towers hitherto existent have presented technical and economic difficulties that have led to short operating periods, which is not viable for a commercial plant in which life spans of between 20 years and 25 years are demanded.

Patent US2008000231 is a clear example of the technology that has existed up until now. Within this patent there is a description of a central tower solar receiver system using molten salts, whose panels are supplied with the salt originating from a cold tank. Once heated, the heat transfer fluid transfers its heat to an exchanger for the production of steam, which is finally used for the production of electricity. The heat transfer fluid which is already cold is sent back to the receiver so that it can be heated again.

The technical problems presented during operation in these plants are mainly related to the resistance of the materials and to the control of the system during transitory states (passing of clouds). Some of the technical difficulties encountered were the appearance of cracks in the sections of the pipes welded to the collectors, where the entrance and exit of the working fluids (headers) take place. This is due to high thermal gradients, the corrosion of the valves for flow distribution control caused by the highly corrosive effect of the mixture of molten salts at high working temperatures, the solidification of the heat transfer fluid inside the pipes especially in areas with a low flow of incident radiation, etc.

The configurations of salt receivers hitherto existing are cylindrical and external. A receiver of this type is composed of panels in groups of eight panels, so that the receiver is divided into four sections (north-east, northwest, south-west and south-east). In turn, each panel is composed of thirty-two vertical pipes.

The entrance of cold heat transfer fluid (cold salts), originating from the cold storage tank, takes place in the central panels situated at the north face (first panel north-east section and first panel north-west section). Half of the entering flow is carried towards the panels in the north-east section and the other half towards the north-west section, with a descending vertical path, alternatively ascending in the adjacent panels (path in the shape of a serpent). Once the eight panels situated at the north face (north-east and north-west) have been passed through, a cross flow is produced, which is to say, the exiting flow from the north-east panels enters the section with the south-west panels and the exiting flow from the north-west panels enters the section with the south-east panels.

As with the sections situated at the north face, the flow of the heat transfer fluid inside the pipes of the adjacent panels is serpent-shaped until it exits.

The exit of the heat transfer fluid takes place at the central panels situated at the south face of the receiver.

According to that explained previously, the molten salt receivers can present various difficulties such as for example, large thermal losses if dealing with an external receiver and structural damage due to the high operating temperatures, the distribution of incident flow (not uniform), thermal tensions to which the material is subjected and the effects of corrosion on the material.

The thermal cycles are generated due to the exposure of the receiver surface to concentrated solar radiation by the heliostat field (with which the metal in the pipes reaches temperatures close to 800° C.), and to the heat transfer fluid temperature gradient between the entrance (290° C., melting point) and the exit of the receiver (565° C., degradation temperature of the salt).

The aforementioned problems with molten salt receivers can be reduced through the use of this new receiver design when dealing with a cavity receiver (installed in the high part of a tower inside a gap or cavity) which also reduces the temperature gradient between the exit and the entrance of the molten salts in the receiver thanks to the recirculation which is explained below. To do so, this invention aims to recirculate a part of the exit flow (mixture of hot molten salts).

The importance of the design and the configuration of the receiver stems from here. A suitable design and configuration of the receiver will lead to stable system control during the operation of the solar plant, especially during transitory periods (passing of clouds); guaranteeing in this way the integrity of the structure and its durability (useful life of the receiver between 20 and 30 years).

Furthermore, the use of molten salts as a heat transfer fluid and a means of thermal storage allows improvements in the efficiency of the thermoelectric solar plant, given that the temperatures reached are higher without the need to increase the operating pressure as would be required with water/steam; which implies a lower cost of the receiver.

DESCRIPTION OF THE INVENTION

This invention proposes the design of a central tower receiver using molten salts with a defined configuration, which facilitates its functioning and control during the operation of the thermoelectric solar plant.

The main advantage of the design which is the object of this invention is that its implementation allows the useful life of the receiver to be increased and a decrease in the differences in temperature between the feed entrance and exit in the pipes which the receiver is composed of. As a consequence, there would be a reduction in the thermal tensions experienced by the material which can result in structural damage, such as fractures and cracks, mainly in the welded areas.

To achieve this, a system is proposed involving recirculation of a percentage of the exit flow of the receiver (mixture of hot molten salts) upon their entrance. This flow percentage must result in the lowest possible load loss, generating at the same time admissible thermal losses for a fixed level of receiver efficiency.

The receiver proposed in this invention, in order to reduce thermal losses, will be of a cavity type. Cavity type receivers are defined as those which are installed at the top of a tower inside a gap or cavity, in order to minimize thermal losses due to radiation or convection. The configuration is in a semi cylindrical shape composed of panels, the receiver area is determined according to the thermal power of the design. The panels are formed of a combination of vertical pipes. The semi cylindrical shape of the receiver allows the maximization of the capture of solar radiation by the heliostat field.

The cold molten salt (heat transfer fluid), originating from the storage tank, is not directly introduced into the receiver, as occurs in state-of-the-art systems, but supplies a mixture deposit which collects cold salt as well as a part of the hot recirculating salt mixing them together in the deposit, so that afterwards said mixture, of cold and hot molten salts, is introduced in the upper part of the vertical pipes which the receiver consists of. On the lower part, the hot salt is collected.

Part of the exit flow of this hot salt (this proportion is defined for reasons of recirculation) is recirculated in the mixture deposit and the rest is carried to the hot salt storage tank. The heating of the salt mixture is produced as the fluid advances through the interior of the combination of vertical pipes in the panels, absorbing the incident solar radiation on the surface.

The configuration of the panels which the receiver consists of is in parallel. The distribution of the entrance fluid (mixture of cold and hot molten salts) within the panels is carried out using control valves on the upper part. The distribution of the flow of fluid is based on the incident solar radiation power in the panels (distribution of non uniform incident flow over time). As a result, in the panels which receive greater incident radiant power, a greater flow of refrigeration will circulate, in this way ensuring that the gradients in the pipe walls of the receivers are at a minimum during their operation.

The recirculation of a part of the exit flow of the receiver (hot molten salt) at its entrance allows, as previously mentioned, reductions in the temperature variations between the entrance and the exit of the vertical pipes of the panels of which the receiver consists of and, as a consequence, reductions in the thermal dilations of the materials from which the pipes are manufactured.

However, as the recirculation percentage increases, not only is there an increase in the difference in temperatures between the entrance and the exit of the vertical tubes that the receiver is composed of, but the load losses in the system increase, so that greater impulsion power of the working fluid is required. Furthermore, the temperature of the metal in the surface of the receiver is greater, resulting in greater thermal losses, mainly due to radiation. As a result, a suitable selection with regards to optimal recirculation for established design power will lead to optimal functioning of the receiver.

The proposed configuration of the molten salt receiver (system with recirculation) minimizes the technological risks which are present in other receivers, in those which the thermal cycles which the material must bear are stronger and, as a result, have a greater impact on the material.

This device must offer solutions to some of the problems detected that exist in molten salt receiver technology and provide advantages in its use, such as the reduction in the risk of damage to the structure and the material of the receiver; and increase the efficiency of the thermodynamic cycle with respect to that currently obtained with saturated and/or overheated steam receivers, thanks to which greater working temperatures are reached.

DESCRIPTION OF THE DRAWINGS

To complete the description that is being made and with the object of assisting in a better understanding of the characteristics of the invention, accompanying said description is a set of drawings wherein, by way of illustration and not restrictively, the following has been represented.

Figure 1:
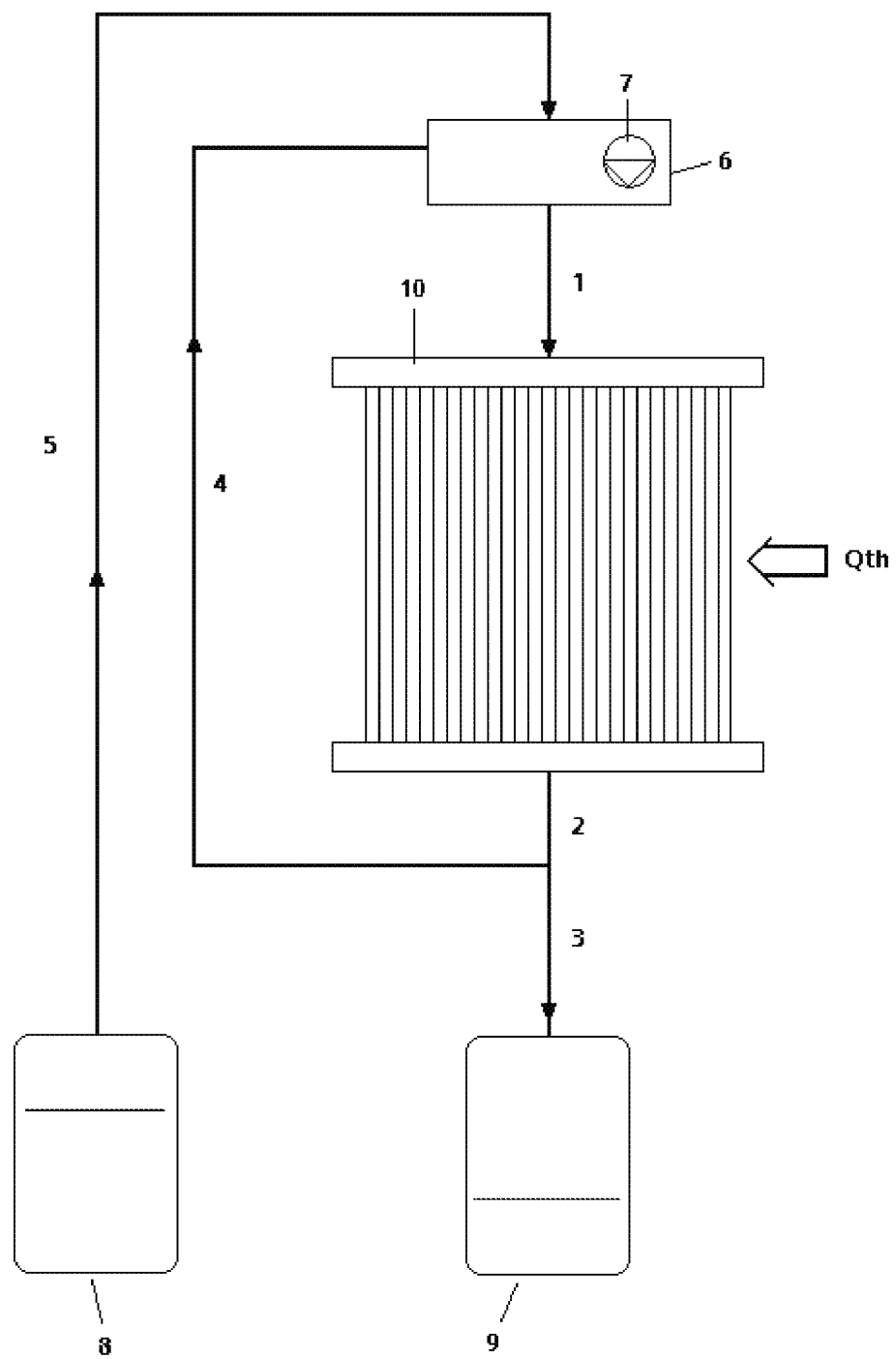
FIG. 1. Configuration of a molten salt receiver formed by a panel with a recirculation system.

A list is provided below with the references used in the figures:

(1) Entrance flow to the receiver
(2) Exit flow from the receiver
(3) Entrance flow to the hot salt storage tank
(4) Recirculation flow of hot salt
(5) Entrance flow of cold salt to the mixer
(6) Mixer (flows 4 and 5)
(7) Impulsion pump of the molten salt mixture
(8) Cold molten salt storage tank
(9) Hot molten salt storage tank
(10) Receiver panel formed by vertical pipes
(11) Panel 2E (East) of the receiver
(12) Panel 1E (East) of the receiver
(13) Panel 1W (West) of the receiver

(14) Panel 2W (West) of the receiver
(15) Control valve for the flow distribution of panel 2E
(16) Control valve for the flow distribution of panel 1E
(17) Control valve for the flow distribution of panel 1W
(18) Control valve for the flow distribution of panel 2W
(19) Focus point of the heliostat field

PREFERRED EMBODIMENT OF THE INVENTION

To achieve a better understanding of the invention, there is a description below of the system and operation of a central tower receiver system using molten salts.

As observed in FIG. 1, the molten salt receiver (10) is formed by a panel composed of vertical pipes.

The cold molten salt (5), originating from the tank in which it is stored (8), is carried to supply a mixture deposit (6) where, by way of a supply line, hot 10 molten salts (4) also arrive, so that the exit flow from the mixer (6) enters the upper part of the vertical pipes of which the receiver is composed (10). On the lower part of said pipes, the hot salt is collected (2).

Part of the exit flow (2) (the quantity being defined for reasons of recirculation which are established) recirculates (4) to the mixture deposit (6) and the rest (3) is carried to the hot salt storage tank (9). The heating of the mixture of cold and hot salts (1) entering the receiver (10) is produced as the fluid advances through the interior of the combination of vertical pipes in the panels, absorbing the incident solar radiation on the surface.

Figure 2:
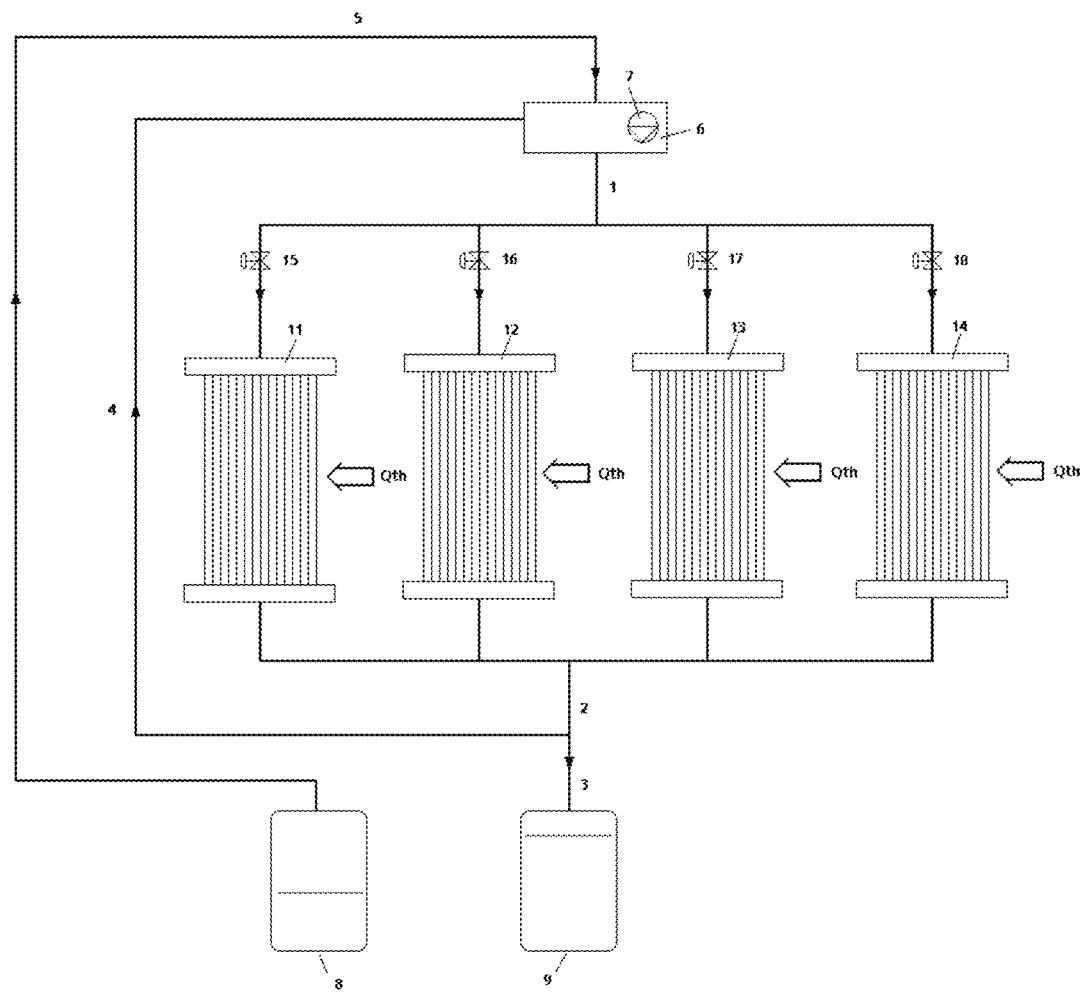
FIG. 2. Configuration of a molten salt receiver formed by four panels with a recirculation system.

Shown in the configuration of the four panel receiver (FIG. 2) is the circulation circuit of the working fluid in parallel through the panels and the flow of recirculation (4) from the exit (2) to the entrance (1) of the receiver.

Each panel (11, 12, 13 and 14) is composed of a combination of vertical pipes. The circulation of the fluid inside the receiver is identical to that described for FIG. 1.

Figure 3:
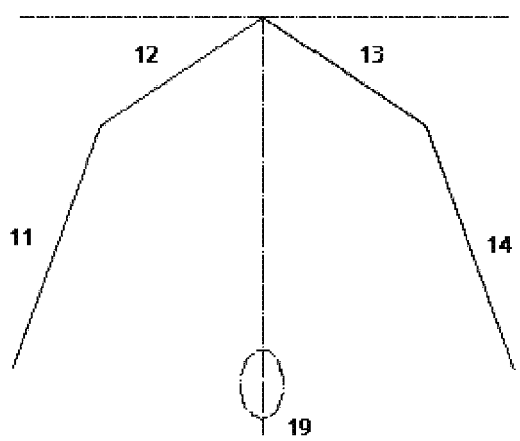
FIG. 3. Geometry of a molten salt receiver formed by four panels.

As observed in FIG. 3, the molten salt receiver is formed by four panels (11, 12, 13 and 14) with a semi cylindrical disposition. This configuration manages to collect all the solar energy reflected by the heliostat field which is directed at the focus point (19).

The heat transfer fluid used in a preferred embodiment is a mixture of molten nitrate salts; a preferred composition would be formed by 60% of $NaNO_3$ and 40% of $KNO_3$.

The invention claimed is:

1. A system for a tower-type thermoelectric solar plant that uses a molten salt heat transfer fluid, the system comprising:
    a cold salt storage tank for storing a quantity of the molten salt heat transfer fluid in a cold state;
    a hot salt storage tank for storing a quantity of the molten salt heat transfer fluid in a hot state;
    a mixture tank;
    a receiver through which the molten salt heat transfer fluid flows and that receives concentrated solar radiation for heating the molten salt heat transfer fluid, the receiver having an inlet and having an outlet from which molten salt heat transfer fluid in the hot state exits the receiver, wherein the outlet of the receiver is connected to both the hot salt storage tank and the mixture tank; and
    a supply line connecting the cold salt storage tank with the mixture tank;
wherein:
    heat transfer fluid in the cold state is supplied through the supply line from the cold salt storage tank to the mixture tank;
    a first portion of the molten salt heat transfer fluid in the hot state exiting the receiver is directed to the hot salt storage tank to be stored;
    a second portion of the molten salt heat transfer fluid in the hot state exiting the receiver is supplied to the mixture tank;
    the heat transfer fluid in the cold and hot states supplied to the mixture tank are mixed in the mixture tank to form a mixture of cold and hot molten salt heat transfer fluid at an intermediate temperature; and
    the mixture of cold and hot molten salts is supplied from the mixture tank to the receiver via the inlet of the receiver to be heated in the receiver.

2. The system according to claim 1 wherein said receiver is a pipe receiver.

3. The system according to claim 2 wherein said receiver is a vertical pipe receiver.

4. The system according to claim 2 wherein said receiver is a horizontal pipe receiver.

5. The system according to claim 1 wherein a mixture of molten nitrate salts is employed as the molten salt heat transfer fluid.

6. The system according to claim 5 wherein a mixture of molten nitrate salts is employed as the molten salt heat transfer fluid, this composition being 60% $NaNO_3$ and 40% $KNO_3$.

7. The system according to claim 1, further comprising an impulsion pump for the exit from the mixture tank to the receiver situated on the top of the tower, and several regulating valves at the entrance of each panel of the receiver.

8. A method of reducing the temperature gradient in a receiver of a tower-type thermoelectric solar plant that uses a molten salt heat transfer fluid, the method comprising:
    flowing the molten salt heat transfer fluid through a receiver and heating the molten salt heat transfer fluid in the receiver by concentrating solar energy onto the receiver;
    directing a first portion of the heated molten salt heat transfer fluid from the receiver to a hot salt storage tank for storage; and
    directing a second portion of the heated molten salt heat transfer fluid from the receiver to a mixture tank;
    supplying molten salt heat transfer fluid in a cold state from a cold salt storage tank to a mixture tank;
    mixing in the mixture tank the cold heat transfer fluid and the hot heat transfer fluid supplied to the mixture tank to form a mixture of cold and hot molten salt heat transfer fluid at an intermediate temperature; and
    supplying the mixture of cold and hot molten salt heat transfer fluid to the receiver.

9. The method of claim 8, wherein the receiver comprises multiple panels, the method further comprising regulating the flow to the panels of the receiver using a set of valves positioned between the mixture tank and respective entrances of the receiver panels.

* * * * *